April 9, 1963  M. E. ASH  3,084,718
PERFORATED DISC RESTRICTOR MEANS FOR USE
IN DISPENSING FERMENTED LIQUORS
Filed June 27, 1960  2 Sheets-Sheet 2

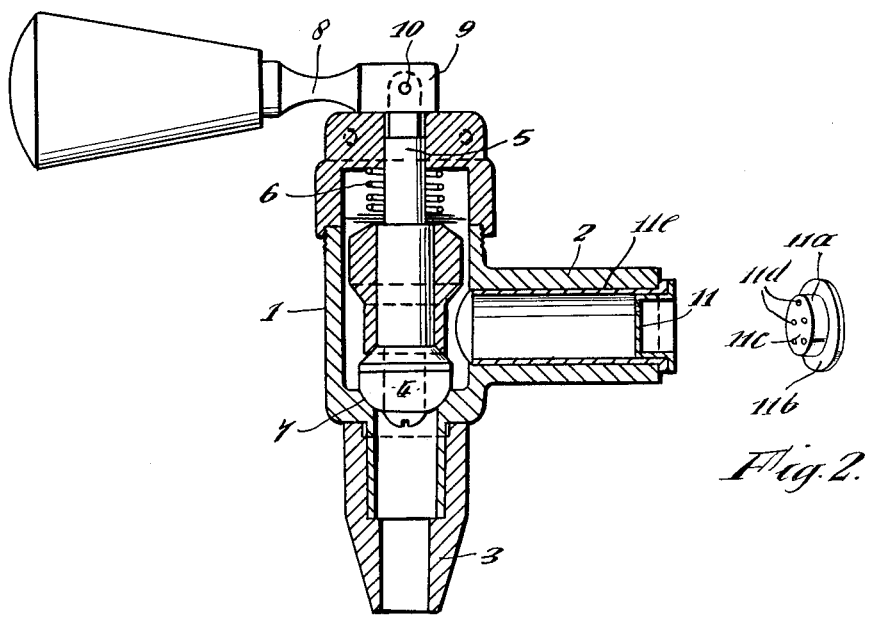

3,084,718
PERFORATED DISC RESTRICTOR MEANS FOR
USE IN DISPENSING FERMENTED LIQUORS
Michael Edward Ash, Ealing, England, assignor to Arthur
Guinness Son and Company (Park Royal) Limited,
a British company
Filed June 27, 1960, Ser. No. 38,889
Claims priority, application Great Britain Jan. 23, 1958
3 Claims. (Cl. 138—40)

This invention relates to the dispensing of liquids, and is primarily concerned with improved means for dispensing beverages containing gas in solution, particularly fermented liquirs, such as beer, stout and ales, from a pressurized system.

This application contains subject matter in common with my co-pending application Serial No. 788,612, filed January 23, 1959, and now abandoned, and is a continuation-in-part of the latter.

It has become customary to employ pressurized casks for serving draught beer using carbon dioxide as pressure medium to avoid the problem of acetification which would arise if air were used as the pressure medium. This method of dispensing is effective, but the head obtainable on the dispensed liquor is not always of a finely divided and enduring character.

The present invention has for its object to provided improved means for dispensing low-carbonated beverages, of the kind referred to, particularly fermented beverages such as beer, stout and ales, from a pressurized vessel, whereby a fine and enduring head of controlled size superior to heads hitherto obtainable may be produced.

In some countries such as the United States highly carbonated beers are dispensed from the keg—for example a pressure of carbon dioxide in the order of 35– 45 lbs. per sq. inch (absolute) is not uncommon. In other countries lesser pressures of carbon dioxide are employed and the present invention has been developed primarily to dispense low-carbonated beers, by which is meant beers which contain carbon dioxide in solution at a pressure of about 15–22 lbs. per sq. inch (absolute), with or without additional gases. The invention has been found particularly effective in the dispensing of beer which contains mixed gases in solution as described in my co-pending application Serial No. 38,699, now Patent No. 3,063,841, where a total dispensing pressure of 35 lbs. per sq. inch (absolute) is employed, for a beer which contains carbon dioxide and nitrogen in solution at partial pressures of 15 lbs. per sq. inch (absolute) for the carbon dioxide and 20 lbs. per sq. inch (absolute) for the nitrogen.

Among the qualities normally sought in a head on beverages such as beer, ale and stout, may be listed the following:

Regularity, by which is meant a consistent bubble size.
Fineness, by which is meant a small bubble size, e.g. bubbles up to about 0.010 inch average diameter.
Homogeneity, by which is meant a continuity of bubble structure without the occurrence of large, irregularly shaped random gaps.
Endurance, by which is meant the ability of the bubble structure, when it has risen to the surface of the liquor after dispensing into a drinking vessel to persist during the process of drinking and regardless of whether or not the liquor is quaffed rapidly or sipped slowly.
By the expression "size of head" is meant the volume of froth initially present on the top of the liquor in any given drinking vessel after the beverage has been dispensed and the majority of the bubbles in suspension have had time to settle out from the liquor.

It is an object of the present invention to provide means for dispensing under controlled head conditions, low-carbonated beverages which contain gas in solution at a substantially constant pressure, from a pressurized container through a delivery passage to an outlet utilizing preferably: a two-position on/off tap for starting and stopping flow through said delivery passage. It is a further object to provide head control means in the form of a perforated thin-walled member constituting a primary constrction in the delivery passage and having a number of apertures of fixed size in use, the maximum individual area of any of the aperatures being such as to produce a fine bubble size in the liquor and the aggregate area of all such apertures being such as to permit a throughflow not less than 20 cubic centimeters per second, and there being—when the tap is open—no constriction in the delivery passage downstream of the primary constriction which is of less aggregate area than the aggregate area of the apertures in the primary constriction, the combination being such that upon the tap being opened and flow taking place through the primary constriction, the applied pressure on the liquor downstream of the primary constriction is immediately reduced and the liquor thereafter proceeds down the delivery passage to the outlet at substantially atmospheric pressure, the sudden pressure drop occasioned by the passage through the plate releasing gas in solution from the liquor, so that a homogeneous, fine and regular head is formed when the liquor is dispensed into a vessel.

The primary constriction advantageously comprises a perforated disc having a number of apertures of fixed size—conveniently, round holes—the disc being removably mounted in the delivery passage so that discs having an appropriate aperture size and giving an appropriate flow rate may be selected and used according to variations in gas pressure, temperature and other dispensing conditions.

The size of the said apertures is limited so as to produce a fine head on the dispensed liquor. For example, the apertures should in general be less than 0.08 inch in diameter, and preferably within the range 0.015 to 0.08 inch in diameter.

Since the function of the primary constriction is to produce a rapid drop in applied pressure on the liquor as it passes through the apertures, and thus to release gas in the form of bubbles, it will be understood that the thickness of the primary constriction in the direction of flow of the liquor must be small, for example in the order of 0.015 inch.

In my co-pending application Serial No. 38,699 it is proposed to use a mixture of carbon dioxide and an inert gas, such as nitrogen, as the gases in solution for draught beer, as it is found that this contributes toward regularity, homogeneity and endurance of the head on the dispensed liquor.

The primary constriction may be located downstream or upstream of the valve member of the tap.

The use of a primary constriction as above defined has been found to produce a very fine and regular head of improved character and quality, this being particularly the case when the applied propellent pressure is balanced by a mixture of carbon dioxide and an inert gas, such as nitrogen, substantially free from oxygen dissolved in the liquor, which materially aids the regularity, homogeneity and endurance of the head.

According to a further feature of the invention, a secondary constriction may be disposed downstream of the primary constriction, said secondary constriction having a bore the cross-sectional area of which is not less than the aggregate cross-sectional area of the apertures in the primary constriction, the cross-sectional area of the secondary constriction in relation to the cross-sectional area of the primary constriction determining the size of head produced under any given conditions of temperature and pressure. The secondary constriction may comprise a nozzle having a tapered bore which decreases in cross-sectional area in the direction of flow of the liquor.

The primary and secondary constrictions may conveniently be removable members embodied in a tap structure adapted to be connected to the pressurized vessel.

Since individual beverages may vary in behaviour and since variations in operating pressure may be desired according to local conditions and temperatures, it will be appreciated that the provision of detachable perforated discs constituting the primary constriction enables rapid adjustment of bubble size and flow rate to be performed. Similarly, the secondary constriction has been found to exert a control on head size, and the ability to substitute differing sizes of tapered nozzle enables a substantially constant head size to be produced under widely varying draughting conditions.

The invention is hereinafter described, by way of example, with reference to the accompanying diagrammatic drawing, in which:

FIG. 1 is a vertical section illustrating a tap structure provided with a primary constriction according to the invention;

FIG. 2 is a perspective view of the primary constriction shown in FIG. 1;

Figure 3:
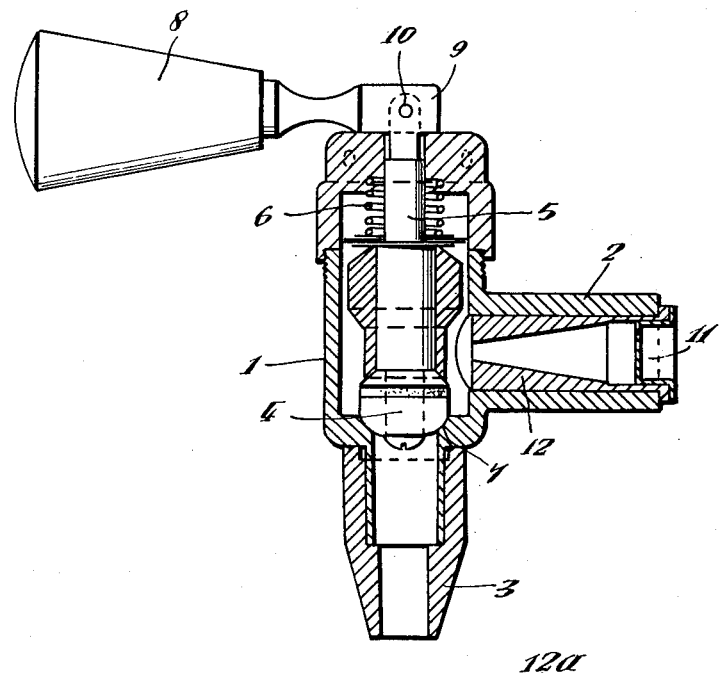
FIG. 3 is a view similar to FIG. 1 illustrating a modification embodying a secondary constriction.

As shown in FIGS. 1 and 2, the primary constriction may be embodied in a two-position tap structure of conventional form. As shown, the tap structure may comprise a body portion 1 having an inlet portion 2 and an outlet portion 3, the gate or valve member of the tap being formed by a resilient member 4 carried by a cam-operated spindle 5 mounted in the body of the tap and loaded in the closing direction by a compression spring 6. The resilient member 4 seats on an annular seating 7 in conventional manner and is operable by a handle 8 pivoted to an extension of the spindle 5 at 10 and having a cam portion 9 which, when the handle 8 is moved from the horizontal position shown towards a vertical position, lifts the spindle 5 and consequently moves the valve member 4 away from the seating 7 against the compression of the spring 6 to permit flow of liquor through a liquid delivery passage extending from a pressurized vessel (not shown) to which the tap structure is connected, and the downward extremity of the outlet portion 3, said liquid delivery passage including liquid flow passages in the inlet portion 2, body portion 1, and outlet portion 3 of the tap structure.

The primary constriction comprises a detachable flanged perforated plate 11 including a sleeve portion 11a, a flange 11b and a thin perforated disc portion 11c. The apertures 11d in the disc 11c must be of limited size not exceeding a certain critical diameter which is a function of the delivery temperature. In the case of beer, it has been found that at 60° F., this critical diameter is of the order of 0.08 inch, but at lower temperatures it is certainly smaller. As long as the apertures are smaller than the critical size, the size of the head is substantially unaffected by the size or number of apertures. It has been found that apertures of about 0.02 inch in diameter are suitable for normal conditions of serving. The thickness of the disc portion 11c preferably should not exceed 0.015 inch so as to ensure a very rapid drop in pressure for releasing gas in solution in the form of bubbles as the liquor passes through the apertures. The aggregate area of the apertures 11d determines the rate of delivery of liquor when the valve member 4 is in the open position. For example, at a dispensing pressure of 20 lbs. per square inch (gauge) and six holes of 0.04 inch diameter a ten ounce glass may be filled in approximately 5 seconds, which represents a flow rate of approximately 60 cubic centimeters per second.

When the primary constriction is located upstream of the valve member 4 of the tap, as shown, the cross-sectional area of the passage through the tap when the valve member is open should be greater than the aggregate cross-sectional area of the apertures 11d in the primary constriction, and no part of the delivery passage downstream of the primary constriction should be of lesser cross-sectional area than said aggregate cross-sectional area of the apertures 11d. Conveniently, the primary constriction 11 may be mounted in a sleeve 11e inserted in a bore in the inlet portion 2 of the tap structure.

In a modification, the primary constriction may be located downstream of the valve member 4 of the tap, i.e. in the part of the delivery passage extending in the outlet portion 3 of the tap structure, in which case no part of the delivery passage downstream of the primary constriction is of lesser area than the aggregate cross-sectional area of the apertures 11d. The shape and size of the part of the tap structure downstream of the primary constriction must be such that the liquor can escape from the outlet portion 3 at least as fast as it can pass through the apertures 11d, and so that the jets of liquor emerging from the apertures 11d are collected together before delivery from said outlet.

The pressurized vessel may be a metal cask equipped with a cylinder containing a gas, such as carbon dioxide or a mixture of gases, such as carbon dioxide with an inert gas, such as nitrogen, and having a reducing valve and a bush to which the inlet portion 2 of the tap structure is connected, either directly or through a suitable conduit. Preferably, the gas cylinder and reducing valve are housed within the cask. Alternatively, a plurality of pressurized vessels may be supplied with gas or mixed gases from a single cylinder or battery of cylinders.

Figure 4:
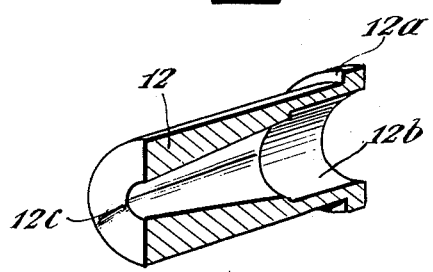
FIG. 4 is a cross-sectional perspective view of the secondary constriction shown in FIG. 3.

In cases where it is desired to control the size of head within predetermined limits, a secondary constriction 12 is used as shown in the embodiment illustrated in FIGS. 3 and 4. The secondary constriction is located downstream of the primary constriction 11. The secondary constriction 12 is in the form of a sleeve replacing the sleeve 11e in the embodiment of FIG. 1, and has a tapered bore converging to a constricted outlet 12c. The inlet end of the secondary constriction 12 has an enlarged bore 12b to receive the primary constriction 11, and a flange 12a abutting against the inlet end of the inlet portion 2 of the tap structure. The cross-sectional area of the outlet 12c is at least equal to the aggregate area of the apertures 11d. The greatest head size is obtained when the secondary constriction exerts no appreciable throttling of the flow through the delivery passage after the liquor has passed through the apertures 11d. On the other hand, the minimum head size will be produced when the cross-sectional area of the outlet 12c is equal to, or only fractionally larger than, the aggregate cross-sectional area of the apertures 11d. Between these upper and lower limits, suitable variations can be obtained in the size of head by varying the size of the outlet 12c of the secondary constriction 12. This is an advantageous feature as it permits variation in head size under constant conditions of serving or, conversely, can be used to produce a substantially constant head when conditions of serving vary, particularly as regards the ambient temperature. The cross-sectional area of the secondary constriction or of any part of the delivery passage downstream of the primary constriction should never be less than the aggregate cross-sectional area of the apertures 11d, otherwise build-up of pressure would occur between the primary constriction 11 and the secondary constriction 12 which would detrimentally affect control of the quality and size of head.

It will be understood that by utilizing interchangeable primary constrictions 11 with apertures of selected diameter within the range indicated, and interchangeable secondary constrictions of selected cross-sectional area in relation to the aggregate cross-sectional area of the apertures in the primary constriction, the character and size of head can be closely controlled for any given temperature of serving, the rate of delivery also being controllable by varying the number of perforations in the primary constriction 11.

Furthermore, it will be understood that the invention is not limited to the particular embodiments hereinbefore described. For example, the primary and secondary constrictions although preferably embodied in the tap structure, may be located at any position in the delivery passage intermediate the pressurized vessel and the tap structure. Alternatively, these constrictions may be located in a detablable outlet nozzle portion of the tap structure.

The primary constriction itself can be of varying form, for example it can be a flat plate-like member, a hemispherical member or a conical or frusto-conical member, provided always that its wall thickness is such as to provide the desired rapid pressure drop.

I claim:

1. A device for insertion in a delivery passage of a system for dispensing under pressure a low-carbonated liquor which contains at least carbon dioxide in solution, said device consisting of a perforated disc having a plurality of holes none of which is greater than 0.08″ in diameter, said disc having a thickness in the direction of flow of the liquor not exceeding 0.015″ to produce a sudden pressure drop in the liquor and promote the release of gas in the form of fine and regular foam.

2. Apparatus as defined in claim 1, wherein the disc is provided with not less than 5 and not more than 6 holes and wherein the aggregate hole area of the primary constriction is not less than 0.005 square inch and not more than 0.008 square inch to provide a flow rate in the order of 60 cc. per second at normal dispensing pressure of 25 lbs. per sq. inch (absolute).

3. Apparatus as defined in claim 1, wherein a secondary constriction is removably mounted in the delivery passage and is disposed downstream of the primary constriction, the secondary constriction comprising a nozzle having a bore of which the cross-sectional area is not less than the aggregate cross-sectional area of the apertures in the primary constriction, said bore being tapered and decreasing in cross-sectional area in the direction of flow of the liquor, the internal length of the tapered bore being at least twice the mean diameter of the delivery passage; the size of head produced when the liquor is dispensed in a vessel being determined by the relation between the cross-sectional area of the secondary constriction in relation to the aggregate cross-sectional area of the apertures in the primary constriction.

References Cited in the file of this patent

UNITED STATES PATENTS

| | | |
|---|---|---|
| 650,834 | Handler | June 5, 1900 |
| 2,020,412 | Handler | Nov. 12, 1934 |
| 2,091,042 | Hedges | Aug. 24, 1937 |
| 2,585,845 | Rosenblum | Feb. 12, 1952 |